US006858157B2

(12) United States Patent
Davidson et al.

(10) Patent No.: US 6,858,157 B2
(45) Date of Patent: Feb. 22, 2005

(54) COMPOSITIONS WITH NANO-PARTICLE SIZE DIAMOND POWDER AND METHODS OF USING SAME FOR TRANSFERRING HEAT BETWEEN A HEAT SOURCE AND A HEAT SINK

(75) Inventors: Jimmy L. Davidson, Brentwood, TN (US); Dale T. Bradshaw, Chattanooga, GA (US)

(73) Assignee: Vnaderbilt University, Nashville, TN (US)

( * ) Notice: Subject to any disclaimer, the term of this patent is extended or adjusted under 35 U.S.C. 154(b) by 0 days.

(21) Appl. No.: 10/417,842

(22) Filed: Apr. 17, 2003

(65) Prior Publication Data

US 2004/0206491 A1 Oct. 21, 2004

(51) Int. Cl.[7] ................................................ C09K 5/00
(52) U.S. Cl. ............................ 252/70; 252/73; 252/76; 252/79
(58) Field of Search .............................. 252/70, 73, 76, 252/79

(56) References Cited

U.S. PATENT DOCUMENTS

| | | | |
|---|---|---|---|
| 6,221,275 B1 | 4/2001 | Choi et al. ..................... | 252/74 |
| 6,432,320 B1 | 8/2002 | Bonsignore et al. .......... | 252/70 |
| 6,447,692 B1 | 9/2002 | Momoda et al. .............. | 252/70 |

OTHER PUBLICATIONS

Maxwell, J.C., "A Treatise on Electricity and Magnetism," 3rd Ed., vol. 1, 1891, Oxford, U.S.: Clarendon Press. 435–449.

Choi, S.U.S., "Enhancing Thermal Conductivity of Fluids with Nanoparticles," *Developments and Applications of Non–Newtonian Flows 1995*, FED–vol. 231/MD–vol. 66, ASME, 1995, 231: p. 99–105.

Lee, et al. "Measuring Thermal Conductivity of Fluids Containing Oxide Nanoparticles," *Journal of Heat Transfer*, 1999 (121): p. 280–289.

Eastman, et al., "Anomalously Increased Effective Thermal Conductivities of Ethylene Glycol–Based Nanofluids Containing Copper Nanoparticles," *Applied Physics Letter*, 2001, vol. 78, No. 6, p. 718–720.

Challoner, et al. "Thermal Conductivity of Liquids: New Determinations for Seven Liquids and Appraisal of Existing Values," in *Proceedings of the Royal Society of London*, vol. 238, Issue 1212, p. 90–106, 1956.

Davis, R.H., "The Effective Thermal Conductivity of a Composite Material with Spherical Inclusions," *International Journal of Thermophysics*, vol. 7, No. 3, 1986, p. 609–620.

Jeffrey, D.J., "Conduction Through a Random Suspensions of Spheres," in *Proceedings of the Royal Society of London*, vol. 335, Issue 1602, p. 355–367, 1973.

Lu, et al. "Effective Conductivity of Composites of Containing Aligned Spheroidal Inclusions of Finite Conductivity," *Journal of Applied Physics*, 1996, vol. 79, No. 9: p. 6761–6769.

Wang, et al. "Thermal Conductivity of Nanoparticle–Fluid Mixture," *Journal of Thermophysics and Heat Transfer*, 1999, vol. 13, No. 4, p. 474–480.

(List continued on next page.)

*Primary Examiner*—Necholus Ogden
(74) *Attorney, Agent, or Firm*—Morris, Manning & Martin; Tim Tingkang Xia, Esq.

(57) ABSTRACT

A heat transfer composition and methods for using same to transfer heat in a transformer. In one embodiment, a heat transfer composition has soy-based oil, an additive comprising a nano-particle size diamond powder characterized by a first mass, and a chemical agent characterized by a second mass, wherein the ratio of the second mass to the first mass is greater than one.

20 Claims, 6 Drawing Sheets

OTHER PUBLICATIONS

Xuan, et al. "Heat Transfer Enhancement of Nanofluids," *International Journal of Heat and Fluid Flow 21*, 2000, p. 58–64.

Klinski, et al. "Mechanism of Heat Flow in Suspensions of Nano–Sized Particles (Nanofluids)," *International Joural of Heat and Mass Transfe 45*, 2002, p. 855–863.

Masuda, H., Ebata, A., Teramae, K., and Hishinuma, N., "Alteration of Thermal conductivity and Viscosity of Liquid by Dispersing Ultra–Fine Particles," *Netsu Bussei* (Japan), 1993, 7(4): p. 227–233.

COMPOSITIONS WITH NANO-PARTICLE SIZE DIAMOND POWDER AND METHODS OF USING SAME FOR TRANSFERRING HEAT BETWEEN A HEAT SOURCE AND A HEAT SINK

The present invention was made with Government support through a grant awarded by the Tennessee Valley Authority. The United States Government may have certain rights to this invention pursuant to the grant.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention generally relates to heat transfer compositions with nano-particle size conductive material powder and methods of using same to transfer heat between a heat source and a heat sink, and in particular to the utilization of nano-particle size conductive material powders such as nano-particle size diamond powders to enhance the thermal capacity and thermal conductivity of heat transfer compositions such as transformer oil.

Certain embodiments of the present invention comprise heat transfer compositions and methods for transferring heat between a heat source and a heat sink. In one embodiment, a heat transfer composition that can be used as transformer oil includes soy-based oil, an additive having a nano-particle size diamond powder characterized by a first mass, and a chemical agent characterized by a second mass, wherein the ratio of the second mass to the first mass is greater than one.

BACKGROUND OF THE INVENTION

Transformer, which is a device that transforms an electric current from one voltage to another voltage, is of great practical importance to the transport and distribution of electrical power. A transformer normally has a primary coil and a secondary coil wound around a core that is usually made of iron to increase corresponding magnetic field and flux. A heat transfer composition such as transformer oil is used to keep the primary and secondary coils and the core cool and transfer heat to the surrounding through radiator.

Heat transfer compositions and methods for transferring heat between a heat source and a heat sink may find many other applications in both heating and cooling, including transformers, refrigerators, air conditioners, computer processors, thermal storage systems, heating pipes, fuel cells, and hot water and steam systems. Heat transfer media include a wide range of liquid or phase change materials, including oils, water, aqueous brines, alcohols, glycols, ammonia, hydrocarbons, ethers, and various halogen derivatives of these materials, such as chlorofluorocarbons (CFCs), hydro chlorofluorocarbons (Huffs), and the like. These have been used alone or in combination with additives, such as refrigerant oil additives for lubrication and composites of fluids to affect boiling or freezing temperature. Such heat transfer compositions are used to transfer heat from one part of a system to another part of the system, or from one system to another system, typically from a heat source (e.g., an vehicle engine, boiler, computer chip, or refrigerator), to a heat sink, to effect cooling of the heat source, heating of the heat sink, or to remove unwanted heat generated by the heat source. The heat transfer medium provides a thermal path or channel between the heat source and the heat sink, and may be circulated through a loop system or other flow system to improve heat flow. For an operating transformer, the heat source includes at least the primary and secondary coils and the core, and the heat sink includes the radiator, which in turn, transfers heat to the surrounding environment.

A number of criteria have been proposed and used for selecting heat transfer media for specific applications. Exemplary criteria include the influence of temperature on heat transfer capacity and viscosity, high dielectric strength, chemical stability of a medium at a given range of temperature and the energy required to pump the medium through a heat transfer system, to name a few. Specific parameters describing the comparative performance of a heat transfer medium include density, thermal conductivity, specific heat, and kinematics viscosity. The maximization of the heat transfer capability of any heat transfer system is important to the overall energy efficiency, material resource minimization, and system costs. Transformer oil is no exception.

Currently transformer oil available in the market has served its purpose well, but it suffers from excessive maintenance and replacement costs, environmental jeopardy and catastrophic failure incidence directly traceable to overheating, which may be partially due to the fact that transformer oil itself is a poor thermal conductor; hence local hot spots may lead to cracking of the oil's molecular composition and insulation collapse (corona).

Other factors that affect the feasibility and performance of heat transfer media such as transformer oil include environmental impact, toxicity, flammability, physical state at normal operating temperature, and corrosive nature.

Thus, among other things, there is a need to develop new and improved heat transfer compositions and methods that are cost-effective and have better performance, which can be used as a heat transfer medium in transformers and in other applications where heat transfer is needed as discussed above.

One of the challenges in finding such new and improved heat transfer compositions and methods is how to enhance thermal conductivity of a heat transfer composition, which often is in a liquid phase and in a form of suspension, without compromising other needed properties and at a reasonable cost. Historically, most research on particle suspensions has considered particles of micron scale or larger. In the present context, prior work may have shown that particles with higher thermal conductivity than their surrounding liquid can increase the composite material's effective thermal conductivity. However, recent work on smaller particles with diameters in the order of 10 nm has shown that further enhancement, beyond that predicted by macroscopic theory, is possible. In the present invention, among other things, we developed and studied such suspensions in an effort to characterize important effects of particle type, size, and concentration in practical engineering fluids for transferring heat without compromising the dielectric strength or viscosity of the fluid(s).

A satisfying explanation for nonsocial size effects on thermal conductivity enhancement has not yet appeared. As nanofabrication technology improves, the availability of solid particles with smaller and smaller size has increased. One significant advantage of nanoparticle suspensions is their improved solubility due to small size. Results by Choi et al.[1] on colloids with grains ranging from 10 nm to 40 nm exhibit good suspension stability for weeks and even months. Further, because heat transfer occurs at the surface interfaces between particles and liquids, larger surface-to-volume ratios are expected to improve thermal conductance. Experiments by Lee et al.[2] demonstrate that smaller-sized (~10 nm) $Al_2O_3$ particles increase the thermal conductivity of aqueous solutions by more than 20% as compared to 40 nm $Al_{2O3}$ particles with an identical volume fraction. Given that the surface-to-volume ratio of 10 nm particles is 1000 greater than that of 10 μm particles, this difference likely begins to explain, at least qualitatively, the experimental observations. Recently, Eastman et al.[3] conducted tests on 10 nm Cu particles in a glycol-based nano-particle suspension and found a 40% increase in thermal conductivity with only 0.3% particle volume fraction—a result that is much higher than that predicted by traditional theory. These results demonstrate the shortcomings of macroscopic models applied to nonsocial materials.

Nevertheless, new models are still needed to predict the thermal conductivity of nano-scale particle suspensions. And new and improved heat transfer compositions and methods that are cost-effective and have better performance need to be developed accordingly.

SUMMARY OF THE INVENTION

The inventors of the present invention recognized that diamond possesses very high thermal conductivity, approximately 2,000 W/(K-m), which is much higher than that of silver [436 W/(K-m)] and copper 401 W/(K-m)] at room temperature. Diamond-liquid suspensions have been shown by the present invention to have higher thermal conductivity than the liquid without diamond particles. Transformer oil has relatively low thermal conductivity, and thermally driven failures are common, particularly as load demands on existing power transmission infrastructure increase. By increasing the thermal conductivity of transformer oil, substantial improvements in transformer lifetime and/or load capacity may be achieved. Unfortunately, a nano-particle size diamond powder or nanodiamond particles sometimes do not suspend well to form a stable suspension in traditional transformer oil although the composition as formed still works. The soy-based transformer oil allows improved nanodiamond particle suspension. Results for both types of oils are developed according to the present invention. Other particles such as $Al_2O_3$, ZnO, $TiO_2$, CuO, $Fe_2O_3$, $CeO_2$, have been utilized with transformer oil and ethylene glycol, respectively. These particles may at least form stable suspensions in ethylene glycol without special treatment.

Thus, in one aspect, the present invention relates to a heat transfer composition comprising soy-based oil, an additive comprising a nano-particle size diamond powder characterized by a first mass, and a chemical agent characterized by a second mass, wherein the ratio of the second mass to the first mass is greater than one.

In one embodiment, the chemical agent comprises D-sorbitol Hexaacetate, and the mass ratio of diamond to D-sorbitol Hexaacetate is about 1:2.9. The nano-particle size diamond powder comprises particles having an average size of less than 100 nanometers.

In another aspect, the present invention relates to a method for transferring heat between a heat source and a heat sink. In one embodiment, the method has the steps of transferring heat between the heat source and the heat sink with a heat transfer composition that includes a nano-particle size diamond powder characterized by a first mass, and a chemical agent characterized by a second mass, wherein the ratio of the second mass to the first mass is greater than one.

The method, prior to the step of transferring heat, further includes the steps of treating the nano-particle size diamond powder with the chemical agent, and combining the treated powder with a heat transfer medium, wherein the step of treating includes the steps of dispersing the chemical agent in a solvent to form a mixture and contacting the nano-particle size diamond powder with the mixture. Additionally, the step of treating the nano-particle size diamond powder with the chemical agent further includes at least one of the steps of complexing the chemical agent with accessible surfaces of particles of the nano-particle size diamond powder, and physically adsorbing the chemical agent on accessible surfaces of particles of the nano-particle size diamond powder, wherein the chemical agent is in sufficient amount to form at least a partial monolayer of the chemical agent on the accessible surfaces of the powder particles.

In one embodiment, the heat transfer medium comprises soy-based oil. Alternatively, the heat transfer medium comprises ethlylene glycol. Furthermore, the heat transfer medium can be selected from the group consisting of water, aqueous brines, mixtures of water with at least one of the group consisting of alcohols, glycols, and ammonia, hydrocarbons, mineral oils, natural oils, synthetic oils, fats, waxes, ethers, esters, glycols, halogen derivatives of at least one of the group consisting of hydrocarbons, mineral oils, natural oils, synthetic oils, fats, waxes, ethers, esters, and glycols, silicate esters, biphenyl, polyaromatic compounds, salt-hydrates, organic eutectics, clathrate-hydrates, paraffins, inorganic and organic eutectic mixtures, and combinations thereof.

In one embodiment, the chemical agent comprises D-sorbitol Hexaacetate, and the mass ratio of diamond to D-sorbitol Hexaacetate is about 1:2.9. The nano-particle size diamond powder comprises particles having an average size of less than 100 nanometers.

In a further aspect, the present invention relates to a heat transfer composition comprising a heat transfer medium, and an additive that comprises a nano-particle size diamond powder characterized by a first mass, and a chemical agent characterized by a second mass, wherein the ratio of the second mass to the first mass is greater than one. In one embodiment, the chemical agent comprises D-sorbitol Hexaacetate, and the mass ratio of diamond to D-sorbitol Hexaacetate is about 1:2.9. The nano-particle size diamond powder comprises particles having an average size of less than 100 nanometers.

In one embodiment, the heat transfer medium comprises soy-based oil. Alternatively, the heat transfer medium may comprise ethylene glycol. Moreover, the heat transfer medium can be selected from the group consisting of water, aqueous brines, mixtures of water with at least one of the group consisting of alcohols, glycols, and ammonia, hydrocarbons, mineral oils, natural oils, synthetic oils, fats, waxes, ethers, esters, glycols, halogen derivatives of at least one of the group consisting of hydrocarbons, mineral oils, natural oils, synthetic oils, fats, waxes, ethers, esters, and glycols, silicate esters, biphenyl, polyaromatic compounds, salt-hydrates, organic eutectics, clathrate-hydrates, paraffins, inorganic and organic eutectic mixtures, and combinations thereof.

In one embodiment, the heat transfer composition may further include at least one additional additive selected from the group consisting of functionalizing agents, dispersants, surfactants, antioxidants, and combinations thereof.

In yet another aspect, the present invention relates to a heat transfer composition comprising a heat transfer medium, and a nano-particle size diamond powder suspended in the heat transfer medium.

In one embodiment, the nano-particle size diamond powder is characterized by a first mass, and the heat transfer composition further comprises a chemical agent characterized by a second mass, wherein the ratio of the second mass to the first mass is greater than one. In one embodiment, the chemical agent comprises D-sorbitol Hexaacetate, and the mass ratio of diamond to D-sorbitol Hexaacetate is about 1:2.9. The nano-particle size diamond powder comprises particles having an average size of less than 100 nanometers.

In one embodiment, the heat transfer medium comprises soy-based oil. Alternatively, the heat transfer medium may comprise ethlylene glycol. Moreover, the heat transfer medium can be selected from the group consisting of water, aqueous brines, mixtures of water with at least one of the group consisting of alcohols, glycols, and ammonia, hydrocarbons, mineral oils, natural oils, synthetic oils, fats, waxes, ethers, esters, glycols, halogen derivatives of at least one of the group consisting of hydrocarbons, mineral oils, natural oils, synthetic oils, fats, waxes, ethers, esters, and glycols, silicate esters, biphenyl, polyaromatic compounds, salt-hydrates, organic eutectics, clathrate-hydrates, paraffins, inorganic and organic eutectic mixtures, and combinations thereof.

In one embodiment, the volume fraction of the nano-particle size diamond powder to the heat transfer medium is in the range of 0.01% to 10.0%. In another preferred embodiment, the volume fraction of the nano-particle size diamond powder to the heat transfer medium is in the range of 0.05% to 5.0%.

Additionally, the heat transfer composition may further include at least one additional additive selected from the group consisting of functionalizing agents, dispersants, surfactants, antioxidants, and combinations thereof.

In yet a further aspect, the present invention relates to a heat transfer composition comprising a heat transfer medium with a first volume, and a nano-particle size conductive material powder with a second volume, wherein the nano-particle size conductive material powder is suspended in the heat transfer medium to form a suspension in which the volume fraction of the nano-particle size conductive material powder to the heat transfer medium is in the range of 0.01% to 10.0% in one embodiment. In another embodiment, the volume fraction of the nano-particle size conductive material powder to the heat transfer medium is in the range of 0.05% to 5.0%. The nano-particle size conductive material powder comprises particles having an average size of less than 100 nanometers.

In one embodiment, the nano-particle size conductive material powder is formed from at least one carbon material selected from the group consisting of graphite, carbon nanotubes, diamond, and fullerene carbons of the general formula $C_{2n}$, where n is an integer of at least 30. In particular, the nano-particle size conductive material powder is formed from diamond, wherein the nano-particle size diamond powder is characterized by a first mass, and the heat transfer composition further comprises a chemical agent characterized by a second mass, wherein the ratio of the second mass to the first mass is greater than one. In one embodiment, the chemical agent comprises D-sorbitol Hexaacetate, and the mass ratio of diamond to D-sorbitol Hexaacetate is about 1:2.9.

Alternatively, the nano-particle size conductive material powder can be formed from at least one material selected from the group consisting of metals, alloys, metal compounds, and combinations thereof.

Moreover, the nano-particle size conductive material powder can be formed from at least one material selected from the group consisting of metal oxides.

In one embodiment, the heat transfer medium comprises soy-based oil. Alternatively, the heat transfer medium may comprise ethylene glycol. Furthermore, the heat transfer medium may be selected from the group consisting of water, aqueous brines, mixtures of water with at least one of the group consisting of alcohols, glycols, and ammonia, hydrocarbons, mineral oils, natural oils, synthetic oils, fats, waxes, ethers, esters, glycols, halogen derivatives of at least one of the group consisting of hydrocarbons, mineral oils, natural oils, synthetic oils, fats, waxes, ethers, esters, and glycols, silicate esters, biphenyl, polyaromatic compounds, salt-hydrates, organic eutectics, clathrate-hydrates, paraffins, inorganic and organic eutectic mixtures, and combinations thereof.

Moreover, the heat transfer composition may further include at least one additional additive selected from the group consisting of functionalizing agents, dispersants, surfactants, antioxidants, and combinations thereof.

In yet another aspect, the present invention relates to a method for transferring heat between a heat source and a heat sink. In one embodiment, the method comprises the step of transferring heat between the heat source and the heat sink with a heat transfer composition that includes a heat transfer medium with a first volume, and a nano-particle size conductive material powder with a second volume, wherein the nano-particle size conductive material powder is suspended in the heat transfer medium to form a suspension in which the volume fraction of the nano-particle size conductive material powder to the heat transfer medium is in the range of 0.01% to 10.0%. In another embodiment, the volume fraction of the nano-particle size conductive material powder to the heat transfer medium is in the range of 0.05% to 5.0%.

In one embodiment, the nano-particle size conductive material powder is formed from at least one carbon material selected from the group consisting of graphite, carbon nanotubes, diamond, and fullerene carbons of the general formula $C_{2n}$, where n is an integer of at least 30.

In particular, the nano-particle size conductive material powder is formed from diamond, wherein the nano-particle size diamond powder is characterized by a first mass, and the heat transfer composition further comprises a chemical agent characterized by a second mass, wherein the ratio of the second mass to the first mass is greater than one. In one embodiment, the chemical agent comprises D-sorbitol Hexaacetate, and the mass ratio of diamond to D-sorbitol Hexaacetate is about 1:2.9. The method, prior to the step of transferring heat, further includes the steps of treating the nano-particle size diamond powder with the chemical agent, and combining the treated powder with a heat transfer medium. Moreover, the step of treating may include the steps of dispersing the chemical agent in a solvent to form a mixture, and contacting the nano-particle size diamond powder with the mixture. Additionally, the step of treating further includes at least one of the steps of complexing the chemical agent with accessible surfaces of particles of the nano-particle size diamond powder, and physically adsorbing the chemical agent on accessible surfaces of particles of the nano-particle size diamond powder. The same, similar, or modified steps can be utilized to treat the nano-particle size conductive material powder formed from materials other than diamond.

Alternatively, the nano-particle size conductive material powder can be formed from at least one material selected from the group consisting of metals, alloys, metal compounds, and combinations thereof.

Moreover, the nano-particle size conductive material powder can be formed from at least one material selected from the group consisting of metal oxides.

In one embodiment, the heat transfer medium comprises soy-based oil. Alternatively, the heat transfer medium may comprise ethlylene glycol. Furthermore, the heat transfer medium may be selected from the group consisting of water, aqueous brines, mixtures of water with at least one of the group consisting of alcohols, glycols, and ammonia, hydrocarbons, mineral oils, natural oils, synthetic oils, fats, waxes, ethers, esters, glycols, halogen derivatives of at least one of the group consisting of hydrocarbons, mineral oils, natural oils, synthetic oils, fats, waxes, ethers, esters, and glycols, silicate esters, biphenyl, polyaromatic compounds, salt-hydrates, organic eutectics, clathrate-hydrates, paraffins, inorganic and organic eutectic mixtures, and combinations thereof.

Moreover, the heat transfer composition may further include at least one additional additive selected from the group consisting of functionalizing agents, dispersants, surfactants, antioxidants, and combinations thereof.

Many applications can be found for these and other aspects of the present invention. For examples, among other things and advantages, the heat transfer compositions of the present invention can be utilized as heat transfer medium in a transformer with better thermal efficiency. By doing so, either the output of a transformer or the life of the transformer or both can be increased, which lead to significant economic benefits.

These and other aspects of the present invention will become apparent from the following description of the preferred embodiment taken in conjunction with the following drawings, although variations and modifications therein may be affected without departing from the spirit and scope of the novel concepts of the disclosure.

DETAILED DESCRIPTION OF THE INVENTION

Figure 1:
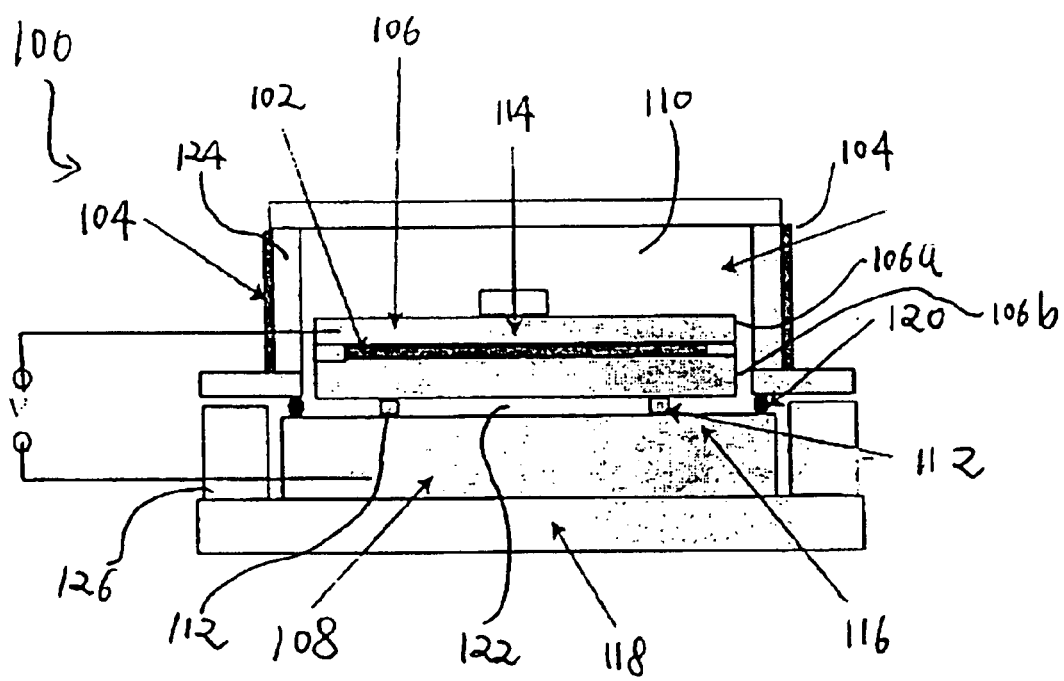
FIG. 1 schematically shows an experimental apparatus that can be used to measure some physical properties of heat transfer compositions of the present invention including thermal conductivity.

Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

Definitions

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the compositions and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "about" or "approximately" shall generally mean within 20 percent, preferably within 10 percent, and more preferably within 5 percent of a given value or range. Numerical quantities given herein are approximate, meaning that the term "about" or "approximately" can be inferred if not expressly stated.

As used herein, "powder" means a collection of particles made from a material that is thermally conductive and in its solid phase.

The preferred particle size for a particle in a powder is influenced by a number of factors, including cost effectiveness, dispersion and settling characteristics. Preferred powders have an average particle size (expressed in terms of the number average value of the largest dimension perpendicular to the longest dimension of the particle) of from about 1 nanometer and 100 microns. More preferred powders have a particle size of from about 1 nanometer to about 2000 nm. Particularly preferred powders have a particle size of from about 1 nanometer to about 100 nm.

A powder may be a powdered metal, powdered alloy, powdered compound of a metal, powdered carbon, powdered carbon compound, or a combination thereof. Exemplary metal-based powders include, for example, those of copper, aluminum, titanium, nickel, beryllium, silver, gold, or iron, alloys or blends, or compounds thereof. Copper and beryllium are particularly preferred metals for forming the powder, copper metal being particularly preferred. Exemplary carbon-based powders include those of graphite, carbon nanotubes, diamond, fullerene carbons of the general formula $C_{2n}$, where n is an integer of at least 30, or blends thereof.

A powder may be chemically or physically affected by association with a chemical agent, for example, by surface complication or physical adsorption of a chemical agent on the surface of the particles of the powder. The chemical agent is preferably one that stabilizes and/or passivates the powder, providing corrosion resistance. This may provide stabilization and passivation of the additive over a wide temperature range and in a wide variety of potentially corrosive environments. Improved redispersion, increased settling time, reduced clumping, and long term stability of the host powder, may also result from the presence of the chemical agent, as compared with a similar powder without the chemical agent. While the exact cause of some of these improvements is not fully understood, it is speculated that the chemical agent controls hydrophobic, hydrophilic, and molecular polarity properties of the powder, thus affecting settling time and redispersion time.

The term "nano-sized particle," or similar terms, as used herein, includes particles that have an average size of from about 1 nm up to 2,000 nm.

The term "agent" is broadly defined as anything that may have an impact on any particle of a thermally conductive material. For examples, the agent can be a chemical agent. The chemical agent may act as a coating for the particles, residing primarily on the surface of the particles, and at least partially covering the surface of the particles.

A "medium" is a fluid that may contain one or more powders, one or more agents, or any combination of them, or none of them. A medium such as oil, water, coolant and the like can be used to transfer heat. The choice of a preferred chemical agent and the choice of a heat transfer medium may depend on each other. Moreover, the choice of a preferred chemical agent may depend not only on the material from which the powder is formed, but also on the chemical environment, for example, whether the heat transfer medium is generally hydrophobic or hydrophilic, the desirability of reducing friction losses in the operating system in which the composition is to be used, the fluid dynamic property of the heat transfer medium and the desirability of maintaining a long term dispersion within the heat transfer composition. One or more of heat transfer additives may be used in combination with a heat transfer medium. In extreme cases, the medium can be in its solid phase and may still be able to transfer heat.

The term "heat transfer fluid," or "heat transfer medium," as used herein, includes liquids, viscous materials, vapor and gaseous heat transfer materials that flow at the operating temperature of a heat transfer system, and includes materials that may be solid at room temperature, but that are flowable at the operating temperature of the system. Propylene glycol, mineral oil, other oils, petroleum derivatives, ammonia, water, coolant and the like may be used as heat transfer medium.

Prestabilized filler may be used to further enhance the effectiveness of the surface modification. For example a material that will inhibit oxidation of the particle, for example, a noble metal, such as gold or silver, with or without a fatty acid may be used as prestabilized filler in combination with powder particles treated with one of the chemical agents described above. One or more of such fillers may be used in combination with a heat transfer medium.

Other additives, such as surfactants to reduce further the interfacial tension between the components, may also be utilized to practice the present invention.

Anti-oxidants may be utilized as well to improve the long-term stability of the composition, while maintaining the superior thermal characteristics of metals as compared to their metal oxide counterparts. Moreover, other additives, such as traditional dispersants, may be used to maintain superior dispersions within the heat transfer fluid.

In one aspect, the stabilized nano-particle to micron-particle size powder provides increased operational energy efficiencies to the thermal transfer fluid through its enhanced thermal capacity. The additive also reduces the need for dispersal mechanisms in the heat transfer system. The additive exhibits slow settling and soft settling characteristics and maintains a colloidal dispersion, as compared with conventional additives. This enables heat transfer systems to operate with higher energy efficiencies through simple addition of the additive to an existing heat transfer medium.

The following is a list of notations that may be used in this specification:

| | |
|---|---|
| k | thermal conductivity |
| Q | power |
| l | thickness |
| A | surface area |
| T | temperature |
| a | ratio of thermal conductivity of nanoparticle to that of the base fluid |
| Φ | volume fraction |
| η | fluid viscosity |
| ρ | density |
| $c_p$ | specific heat |
| d | diameter |
| L | mean free path |
| Subscripts | |
| eff | effective property |
| g | glass property |
| f | base fluid property |

Overview of the Invention

In one aspect, the present invention relates to a heat transfer composition comprising a heat transfer medium with a first volume, and a nano-particle size conductive material powder with a second volume, wherein the nano-particle size conductive material powder is suspended in the heat transfer medium to form a suspension in which the volume fraction of the nano-particle size conductive material powder to the heat transfer medium is in the range of 0.01% to 10.0% in one embodiment. In another embodiment, the volume fraction of the nano-particle size conductive material powder to the heat transfer medium is in the range of 0.05% to 5.0%. The nano-particle size conductive material powder comprises particles having an average size of less than 100 nanometers.

In one embodiment, the nano-particle size conductive material powder is formed from at least one carbon material selected from the group consisting of graphite, carbon nanotubes, diamond, and fullerene carbons of the general formula $C_{2n}$, where n is an integer of at least 30. In particular, the nano-particle size conductive material powder is formed from diamond, wherein the nano-particle size diamond powder is characterized by a first mass, and the heat transfer composition further comprises a chemical agent characterized by a second mass, wherein the ratio of the second mass to the first mass is greater than one. In one embodiment, the chemical agent comprises D-sorbitol Hexaacetate, and the mass ratio of diamond to D-sorbitol Hexaacetate is about 1:2.9.

Alternatively, the nano-particle size conductive material powder can be formed from at least one material selected from the group consisting of metals, alloys, metal compounds, and combinations thereof.

Moreover, the nano-particle size conductive material powder can be formed from at least one material selected from the group consisting of metal oxides.

In one embodiment, the heat transfer medium comprises soy-based oil. Alternatively, the heat transfer medium may comprise ethlylene glycol. Furthermore, the heat transfer medium may be selected from the group consisting of water, aqueous brines, mixtures of water with at least one of the group consisting of alcohols, glycols, and ammonia, hydrocarbons, mineral oils, natural oils, synthetic oils, fats, waxes, ethers, esters, glycols, halogen derivatives of at least one of the group consisting of hydrocarbons, mineral oils, natural oils, synthetic oils, fats, waxes, ethers, esters, and glycols, silicate esters, biphenyl, polyaromatic compounds, salt-hydrates, organic eutectics, clathrate-hydrates, paraffins, inorganic and organic eutectic mixtures, and combinations thereof.

Moreover, the heat transfer composition may further include at least one additional additive selected from the group consisting of functionalizing agents, dispersants, surfactants, antioxidants, and combinations thereof.

In yet another aspect, the present invention relates to a method for transferring heat between a heat source and a heat sink. In one embodiment, the method comprises the step of transferring heat between the heat source and the heat sink with a heat transfer composition that includes a heat transfer medium with a first volume, and a nano-particle size conductive material powder with a second volume, wherein the nano-particle size conductive material powder is suspended in the heat transfer medium to form a suspension in which the volume fraction of the nano-particle size conductive material powder to the heat transfer medium is in the range of 0.01% to 10.0%. In another embodiment, the volume fraction of the nano-particle size conductive material powder to the heat transfer medium is in the range of 0.05% to 5.0%.

In one embodiment, the nano-particle size conductive material powder is formed from at least one carbon material selected from the group consisting of graphite, carbon nanotubes, diamond, and fullerene carbons of the general formula $C_{2n}$, where n is an integer of at least 30.

In particular, the nano-particle size conductive material powder is formed from diamond, wherein the nano-particle size diamond powder is characterized by a first mass, and the heat transfer composition further comprises a chemical agent characterized by a second mass, wherein the ratio of the second mass to the first mass is greater than one. In one embodiment, the chemical agent comprises D-sorbitol Hexaacetate, and the mass ratio of diamond to D-sorbitol Hexaacetate is about 1:2.9. The method, prior to the step of transferring heat, further includes the steps of treating the nano-particle size diamond powder with the chemical agent, and combining the treated powder with a heat transfer medium. Moreover, the step of treating may include the steps of dispersing the chemical agent in a solvent to form a mixture, and contacting the nano-particle size diamond powder with the mixture. Additionally, the step of treating further includes at least one of the steps of complexing the chemical agent with accessible surfaces of particles of the nano-particle size diamond powder, and physically adsorbing the chemical agent on accessible surfaces of particles of the nano-particle size diamond powder. The same, similar, or modified steps can be utilized to treat the nano-particle size conductive material powder formed from materials other than diamond.

Alternatively, the nano-particle size conductive material powder can be formed from at least one material selected from the group consisting of metals, alloys, metal compounds, and combinations thereof.

Moreover, the nano-particle size conductive material powder can be formed from at least one material selected from the group consisting of metal oxides.

In one embodiment, the heat transfer medium comprises soy-based oil. Alternatively, the heat transfer medium may comprise ethlylene glycol. Furthermore, the heat transfer medium may be selected from the group consisting of water, aqueous brines, mixtures of water with at least one of the group consisting of alcohols, glycols, and ammonia, hydrocarbons, mineral oils, natural oils, synthetic oils, fats, waxes, ethers, esters, glycols, halogen derivatives of at least one of the group consisting of hydrocarbons, mineral oils, natural oils, synthetic oils, fats, waxes, ethers, esters, and glycols, silicate esters, biphenyl, polyaromatic compounds, salt-hydrates, organic eutectics, clathrate-hydrates, paraffins, inorganic and organic eutectic mixtures, and combinations thereof.

Moreover, the heat transfer composition may further include at least one additional additive selected from the group consisting of functionalizing agents, dispersants, surfactants, antioxidants, and combinations thereof.

Without intend to limit the scope of the invention, exemplary compositions and their thermal properties according to the embodiments of the present invention are given below. Note that titles or subtitles may be used in the examples for convenience of a reader, which in no way should limit the scope of the invention.

EXAMPLES

Experimental Setup and Measurement

Common techniques for measuring the thermal conductivity of liquids include the parallel-plate method and transient hot wire method. The steady-state parallel plate method is adapted from Challoner and Powell[4] to test all samples disclosed herein. For easier processing, some modifications were made including the guard heater, and temperature probe positions.

The experimental apparatus 100 is shown in FIG. 1. The apparatus 100 has central and guard heaters 102, 104 that are adhesive silicon band heaters. The central heater 102 is used to provide heat to the suspension samples (not shown) that would be placed between upper and lower copper plates 106, 108. To allow that the heat from the central heater 102 proceeds through the suspension, a guard heater 104 is used to provide heat to the aluminum chamber 110 surrounding the upper copper plate 106, which is 1.5 inch in diameter. The upper and lower copper plates 106, 108 are separated by a number of (here three) glass spacers 112 arranged in a triangular pattern. Each spacer has 1 mm² surface area and 0.98 mm thickness. The upper copper plate 106 has two parts 106a, 106b, which are screwed together with central heater 102 between them. A 1.5 mm hole (not shown) was drilled in the center of the upper copper plate 106 to allow the insertion of a glass-bead thermistor 114. Another 1.5 mm hole (not shown) was drilled into the lower copper plate 108 for locating another thermistor 116. The temperature difference between the two thermistors 114, 116 enables the calculation of thermal conductivity. AC and DC voltages can be applied between the upper and lower copper plates 106, 108 to test for electrorheological effects. Insulating varnish was applied to the aluminum guard elements to provide electrical insulation for electrorheological tests. To keep the lower copper plate 108 temperature constant and remove heat, a water bath 118 was in thermal contact with the lower copper plate 108 and connected to an aluminum plate (not shown). An O-ring 120 was used to seal the testing suspension in the apparatus 100 and to separate the upper aluminum guard chamber 106 and lower copper plate 108 to form a chamber 122, where the testing suspension is to be placed. Four nylon screws (not shown) were used to assemble the upper aluminum guard chamber 124 and the lower aluminum guard cylinder 126, and the O-ring 120 maintained a spacing of approximately 1 mm between them.

Thermistors and thermocouples 114, 116 were connected to a National Instrument TBX-68T data acquisition board, which communicated temperature readings to a data-acquisition computer. A LabView virtual instrument program was designed to control power supply through a general purpose integrated board card. The central heater's power input remained constant while the guard heater's power input adjusted every 3 seconds to match the temperature readings of the thermistor in the upper plate and the thermocouple above the upper copper plate. Another thermocouple was used to measure the ambient temperature to adjust the water bath's temperature to match room temperature. Thermistors were calibrated before the experiments, and readings from the two thermistors at room temperature were within 0.01 Celsius degrees. Thermal conductivity results of raw transformer oil and ethylene glycol were within 5% of published values.

During the experiments, the temperature differences between two copper plates 106, 108 were controlled to be greater than 5° C. The gross thermal conductivity of the nanoparticle suspensions and glass spacer can be calculated by a one-dimensional heat conduction equation:

$$K = \frac{Q}{A} \frac{l}{\Delta T} \quad (1)$$

where Q is the power input of central heater; l=0.98 mm is the glass spacer thickness; A is the upper copper plate cross-sectional area; and $\Delta T$ is the temperature difference between the two thermistors. The nanoparticle suspension's thermal conductivity is calculated from equation suggested by Wang et al[6]:

$$K_{eff} = \frac{kA - k_g A_g}{A - A_g} \quad (2)$$

where $A_g$ is the total glass spacer area; $k_g$ is glass spacer thermal conductivity [0.88 W/(K-m)].

Experimental Results and Implications

Figure 2:
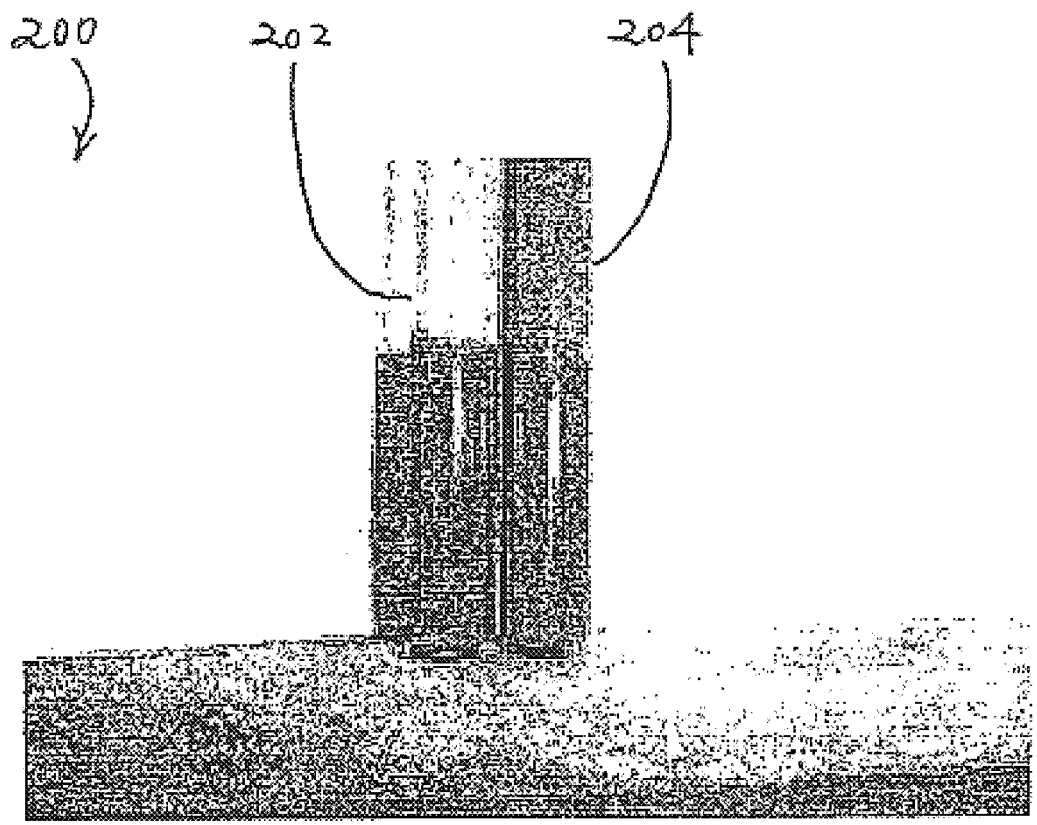
FIG. 2 shows an image with a suspension sample of a first heat transfer composition with nano-particle size diamond powder in transformer oil (left) and a suspension sample of a second heat transfer composition with nano-particle size diamond powder in soy-based transformer oil (right) with 0.24% volume fraction according to one embodiment of the present invention.

The nanoparticle suspensions prepared and tested according to the present invention included different volume fractions of diamond, $Al_2O_3$, ZnO, $TiO_2$, CuO, $Fe_2O_3$ and $CeO_2$ particles dispersed in transformer oil, soy-based transformer oil and ethylene glycol. The inventors discovered that nano-diamond particles may not suspend that well in transformer oil and sedimentation occurred quickly. In one embodiment, transformer oil was substituted with soy-based transformer oil which, for example, can be obtained from BioTrans, and nanodiamond particles mixed with DSH (D-Sorbitol Hexaacetate) to form a stable suspension in soy-based transformer oil. The mass ratio of diamond to DSH was about 1:2.9. As shown in FIG. 2, an image 200 illustrates a nano-diamond powder in transformer oil forming a suspension 202 that was unstable and thus settled, and a nano-diamond powder in soy-based transformer oil with 0.24% volume fraction to form a suspension 204 that is stable.

Experimental results of the 0.43% volume fraction nano-diamond-transformer-oil suspension showed a 9.09% increase in thermal conductivity. Experiments on the 0.22% volume fraction nano-diamond-transformer-oil suspension showed a 6.98% increase. Thus, a range of volume fraction nano-diamond-transformer-oil suspension can be used to practice the present invention. The soy-based transformer oil's thermal conductivity was measured to be 0.176 W/(mK), while traditional transformer oil's thermal conductivity measured 0.127 W/(mK). Therefore, the nano-diamond-soy-based transformer-oil's thermal conductivity is 48% higher than the traditional, mineral-based transformer oil. This large increase of thermal conductivity can potentially reduce the pumping power to remove heat, reduce the size of the transformer, and/or increase power transmission capacity. In addition, soy-based transformer oil is environmental degradable. A further unique aspect of the nanoparticle suspensions of the present invention is that they do not compromise the electrical properties including dielectric strength and the fludic properties including viscosity of the suspensions, which distinguish the nanoparticle suspensions of the present invention from other currently available compositions. In other words, among other things, the nanoparticle suspensions of the present invention have the dielectric strength approximately same to that of the transformer oil or the soy-based transformer oil without the addition of the nanodiamond particles. Likewise, the nanoparticle suspensions of the present invention have the viscosity approximately same to that of the transformer oil or the soy-based transformer oil without the addition of the nanodiamond particles. Therefore, the nanoparticle suspensions of the present invention, among other applications, can be well utilized as heat transfer medium in a transformer (i.e., as transformer oil) with better thermal efficiency and required electrical and fludic properties.

Several more tests were conducted on nanoparticles obtained from Nanophase Technology Company. The average particle sizes are listed in Table 1.

TABLE 1

Particle sizes of the ethylene glycol suspension

| Particle | Average Size (nm) |
|---|---|
| $Al_2O_3$ | 29 |
| $CeO_2$ | 29 |
| $TiO_2$ | 40 |
| CuO | 33 |
| $Fe_2O_3$ | 28 |
| ZnO | 56 |

The six different kinds of particles were dispersed in ethylene glycol to form 0.5%, 1.5%, 3% and 4% volume fraction nano-particle suspensions. Volume fraction is defined as the volume of nano-particles divided by the total volume of the mixture of nano-particles and ethylene glycol. Each suspension was placed into an ultrasonic bath for about 4 hours to disperse nano-particles uniformly. Most nano-particles suspended stably for testing. Other choices of the volume fraction can be utilized to practice the present invention, however, when the volume fraction was higher than about 4%, sedimentation was apparent. All samples except the nano-diamond suspensions were prepared without surfactants.

Figure 3:
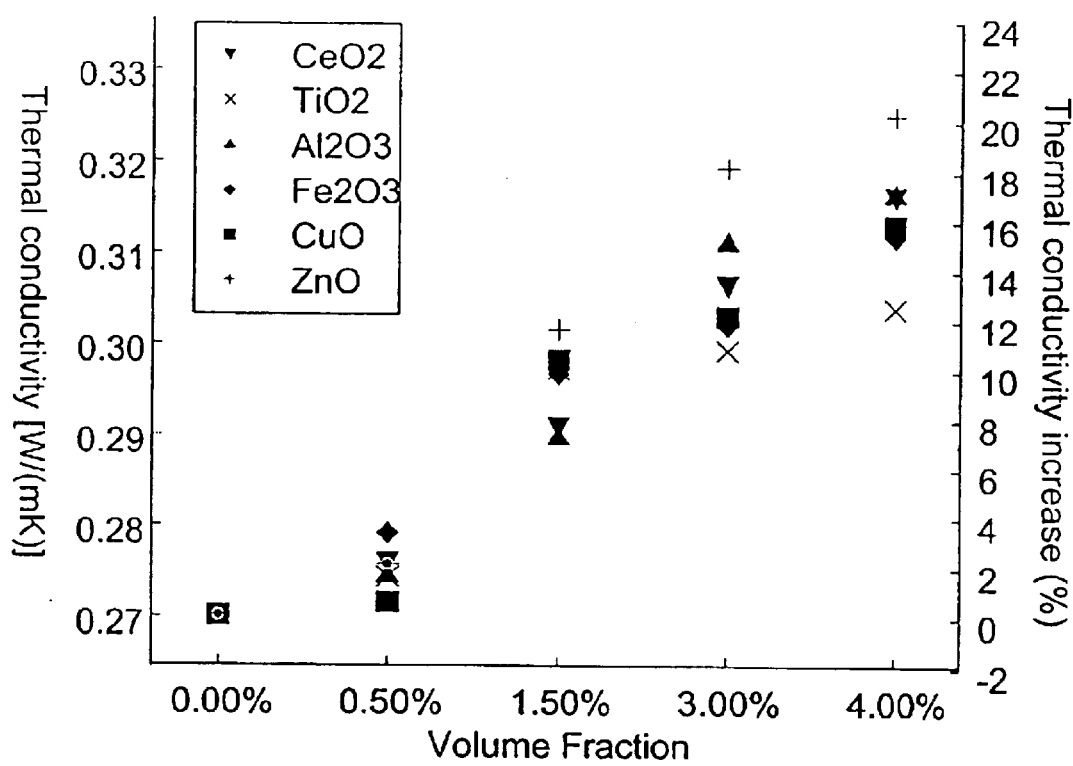
FIG. 3 shows the thermal conductivities of ethylene glycol nano-particle size conductive material suspensions according to one embodiment of the present invention.

Referring now to FIG. 3, the thermal conductivities of ethylene glycol nano-particle suspensions are shown. Six different kinds of particles with four different volume fractions were tested at room temperature (298K). Thermal conductivity increases as volume fraction increases in all cases.

Still referring to FIG. 3, the percentage increase of thermal conductivity relative to ethylene glycol is also shown. For examples, for 4% volume fractions, the effective thermal conductivity increased by 13% to 21%.

Figure 4:
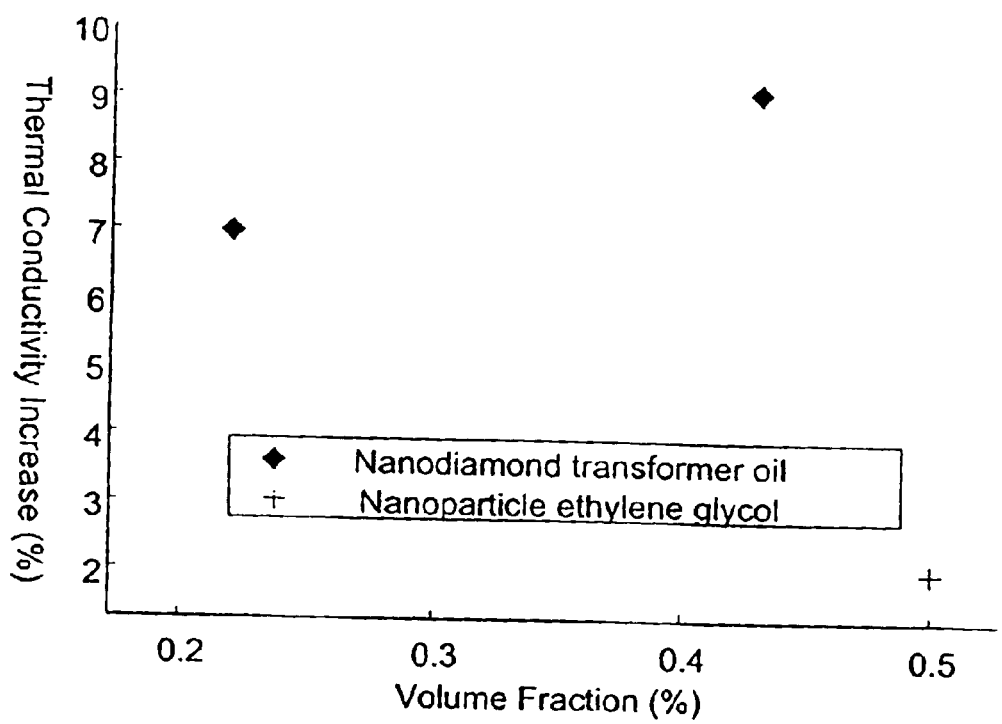
FIG. 4 shows comparison between nano-particle size diamond powder and transformer oil suspension and nano-particle size diamond powder and ethylene glycol suspension according to one embodiment of the present invention.

Among other things disclosed according to the present invention, the thermal conductivity increases of nano-diamond transformer oil suspensions are found to be substantially greater than suspensions in ethylene glycol at comparable volume fractions. Referring now to FIG. 4, the relative increase for nano-diamond transformer oil suspensions at volume fractions of 0.22% and 0.43% as well as the average of the 0.5% ethylene glycol suspensions are shown. The nano-diamond transformer oil suspension shows an increase of 7% to 9% at very low volume fractions (0.22% to 0.43%), respectively, while the 0.5% ethylene glycol suspensions exhibit an average increase of only 2%.

Figure 5:
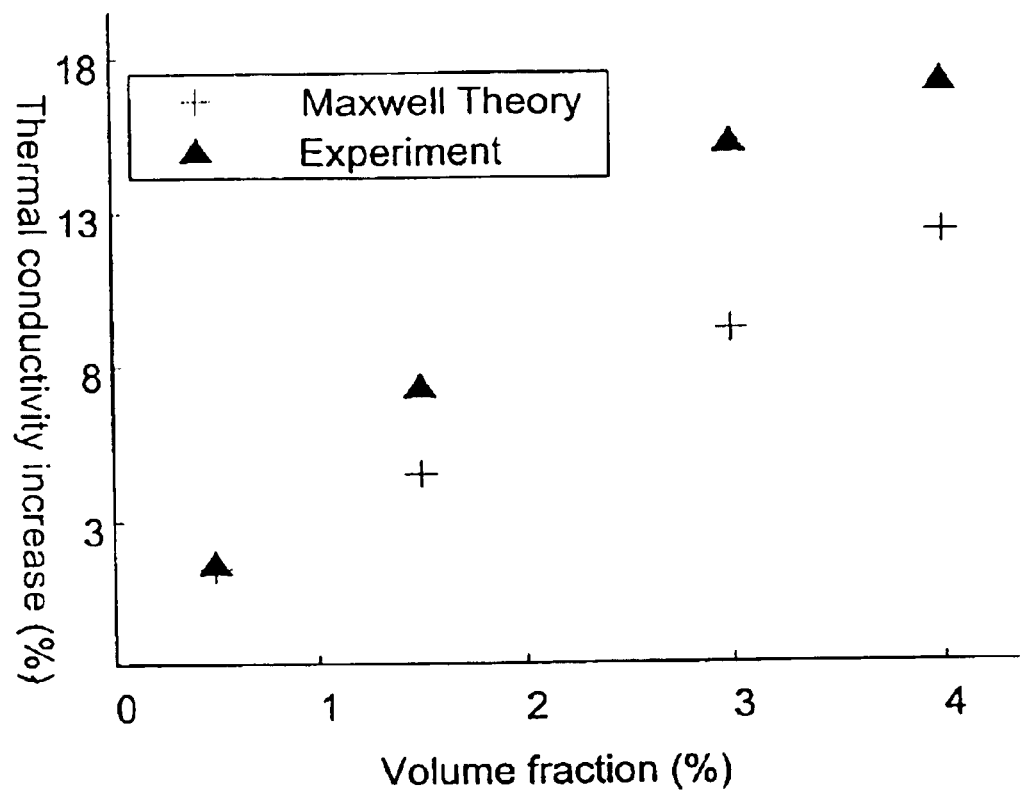
FIG. 5 shows nano-particle size $Al_2O_3$ powder and ethylene glycol suspension's experimental results according to one embodiment of the present invention compared with the calculation from Maxwell's model.
Figure 6:
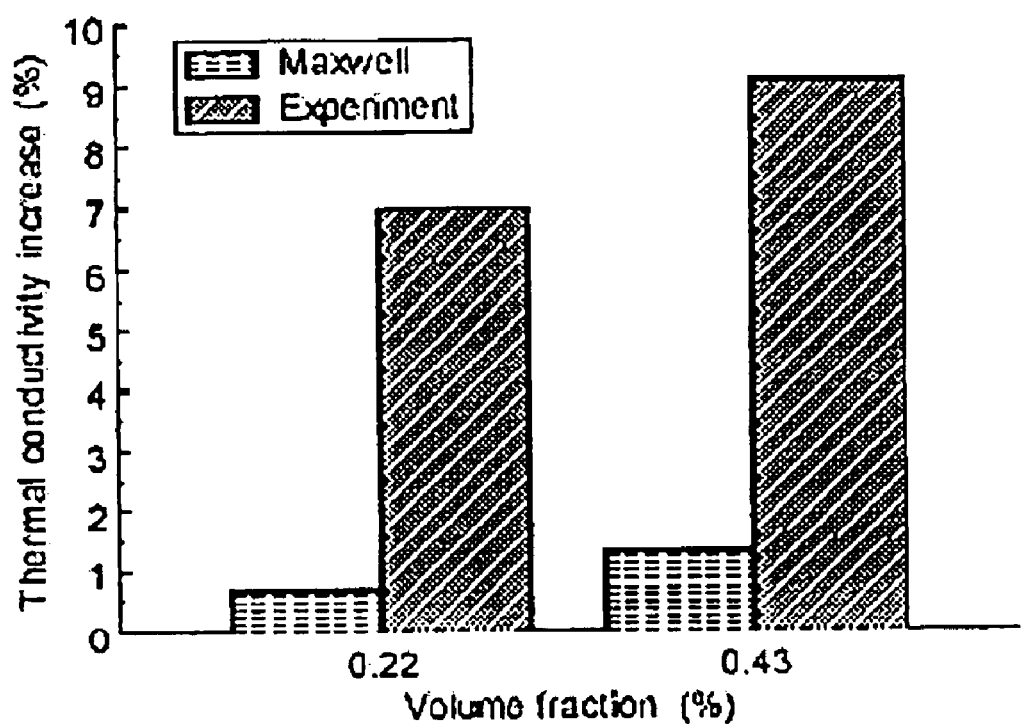
FIG. 6 shows thermal conductivity increase of the nano-particle size diamond powder and transformer oil suspension according to one embodiment of the present invention compared with the calculation from Maxwell's model.

Maxwell[1] proposed a theory that may be used to explain the thermal conductivity of solid-fluid mixtures. Effective thermal conductivity can be expressed as:

$$K_{eff} = \left(1 + \frac{3(\alpha - 1)\Phi}{(\alpha + 2) - (\alpha - 1)\Phi}\right)k_f \quad (3)$$

where $K_{eff}$ is the effective thermal conductivity of the nano-particle suspension, $k_f$ is the thermal conductivity of the base fluid, $\alpha$ is the ratio of thermal conductivity of particle to thermal conductivity of fluid, and $\Phi$ is the volume fraction of the nano-particle suspension. Comparisons between theory and experiment for alumina-ethylene-glycol and diamond-transformer-oil suspensions of the present invention are shown in FIGS. 5 and 6, respectively. At the lowest volume fraction as shown in FIG. 5, theory and experiment agree. However, as volume fraction increases, the experimental values exceed theoretical predictions substantially. For the diamond-transformer-oil suspension, experimental measurements of thermal conductivity significantly exceed predictions for both volume fractions.

Electrorheological tests were performed on nano-diamond-transformer-oil and nanoparticle-ethylene-glycol suspensions. For the latter, self-heating of the fluid due to current leakage precluded the generation of meaningful data. For nano-diamond-transformer-oil suspensions with applied AC and DC voltages of 20 V, no thermal conductivity change was observed. The results as shown in FIG. 5 and FIG. 6, respectively, indicate that traditional macroscopic theory substantially under predicts thermal conductivity enhancement for nanometer-scale particles. The inventors note that comparison of the present results for alumina-ethylene-glycol suspensions confirm those reported by Wang et al.[6] Other, more complex theoretical models exist[7-9], but these models generate predictions that are similar to those using Maxwell's model[1].

Moreover, for nanodiamond-transformer oil suspensions, the present observation of up to 9% increase in thermal conductivity for very low volume fractions (<0.5%) is qualitatively consistent with prior experimental observations. Eastman et al[4] measured a 40% increase of thermal conductivity for Cu-ethylene glycol suspensions with a very low volume fraction of 0.3%. Existing theoretical models underpredict these increases by an order of magnitude or more.

These observations suggest that particles size, which is not included in traditional models, plays an important role in thermal conductivity enhancement. Comparing the work of Masuda et al.,[5] Wang et al.[6], and Lee et al,[3] a 3% volume fraction of $Al_2O_3$ (particles sizes of 13 nm, 28 nm and 38 nm) in ethylene glycol suspension caused increases of 20%, 12%, and 8% in thermal conductivity. The experimental result from current discovery shows 15% increase with 28 nm $Al_2O_3$ particles at a volume fraction of 3%. Although an empirical relationship between particle size and thermal enhancement could perhaps be established, a satisfactory theoretical explanation remains elusive.

The current discovery thus suggests that particle size effects occur through micro- or nano-scopic motion of the particles. These motions could be driven by random thermal perturbations (i.e., Brownian motion) or by some other force, such as random electrorheological fluctuations. For the former case, the inventors have applied the Brownian motion analysis of Wang et al.[6] and Keblinski et al.[7] to the nanodiamond particles and found that the ratio of thermal to particle diffusion times is of the order $10^8$. This result suggests that, consistent with the findings in prior work, Brownian motion by itself does not explain the observed increase in thermal conductivity.

In another aspect of the present invention, particle sizes and preparation can also influence the quality of dispersion. Xuan et al.[11] observed significant particle clustering with and without the addition of surfactants. In work by Keblinksy et al.[8], the packing density of particles was studied, and the authors suggested that packed particles effect greater increases in thermal conductivity because the effective volume of the cluster is much larger than actual solid particle volume fraction. On the other hand, the propensity of larger clusters to precipitate from suspension is greater than that of randomly dispersed particles. Thus, further study of this issue is needed.

In sum, among other things, a variety of nanoparticle suspensions and methods of using same for transfer heat and thermal conductivities the nanoparticle suspensions have been prepared, performed and measured according to the present invention. The experimental results show greater increases in thermal conductivity than traditional theoretical models predict. Particle size, physical properties, clustering, and volume fraction apparently influence thermal conductivity.

The deficiency in traditional models possibly rests in exclusion of particle size, clustering effects, and nonsocial particle interactions. Further study of the mechanism(s) of thermal conductivity enhancement in nonsocial particle suspensions and new mathematical models applicable to nonsocial behavior are needed.

While there has been shown various embodiments of the present invention, it is to be understood that certain changes can be made in the form and arrangement of the elements of the system and steps of the methods to practice the present invention as would be known to one skilled in the art without departing from the underlying scope of the invention as is particularly set forth in the Claims. Furthermore, the embodiments described above are only intended to illustrate the principles of the present invention and are not intended to limit the claims to the disclosed elements.

List of References

1. Maxwell, J. C. *A Treatise on Electricity and Magnetism.* 3rd ed. Vol. 1. 1881, Oxford, U.S.: Clarendon Press. 435.
2. Choi, S. U. S., Enhancing Thermal Conductivity of Fluids with Nanoparticles. *Developments and applications of Non-Newtonian Flow*, D. A. Signiner and H. P. Wang, eds., FED-Vol. 231/MD-Vol.66, *ASME*, 1995. 231: p. 99–105.
3. Lee, S., Choi, S. U. S., Eastman, J. A. Measuring Thermal Conductivity of Fluids Containing Oxide Nanoparticles. *Journal of Heat Transfer*, 1999 (121): p. 280–289.
4. Eastman, J. A. Choi, S. U. S., Li, S., Yu, W., Thompson, L. J., Anomalously Increased Effective Thermal Conductivities of Ethylene Glycol-based Nanofluids Containing Copper Nanoparticles. *Applied Physics Letter*, 2001. 78(6): p. 718–720.
5. Challoner, A. R., Powell, R. W. *Thermal Conductivity of Liquids. New Determinations for Seven Liquids and Appraisal of Existing Values in Proceedings of the Royal Society of London*, 1956.
6. Davis, R. H., The Effective Thermal Conductivity of a Composite Material with Spherical Inclusions, *International Journal of Thermophysics*, 1986. 7: p. 609–620.
7. Jeffrey, D. J. *Conduction Through A Random Suspensions of Spheres in Proceedings of Royal Society of London*, 1973. London.
8. Lu, S., Lin, H., Effective Conductivity of Composites of Composites Containing Aligned Spherical Inclusions of Finite Conductivity. *Journal of Applied Physics*, 1996. 79(0): p. 6761–6769.
9. Masuda, H., Ebata, A., Teramae, K., and Hishinuma, N., Alteration of Thermal conductivity and Viscosity of Liquid by Dispersing Ultra-fine Particles. *Netsu Bussei* (Japan), 1993. 7(4): p. 227–233.
10. Wang, X. W., Xu, X, Choi, S. U. S., Thermal Conductivity of Nanoparticle-Fluid Mixtures. *Journal of Thermophysics and Heat Transfer*, 1999. 13(4): p. 474–480.
11. Xuan, Y., Li, Q., Heat Transfer Enhancement of Nanofluids. *International Journal of Heat and Fluid Flow*, 2000 21: p. 58–64.
12. Keblinski, P., Phillpot, S. R., Choi, S. U. S., Eastman, J. A., Mechanism of Heat Flow in Suspensions of Nano-sized Particles (Nanofluids) *International Journal of Heat and Mass Transfer*, 2002. 45: p. 855–863.

What is claimed is:

1. A heat transfer composition comprising:
   soy-based oil; and
   an additive comprising:
   a nano-particle size diamond powder characterized by a first mass, and
   a chemical agent characterized by a second mass, wherein the ratio of the second mass to the first mass is greater than one.

2. The heat transfer composition of claim 1, wherein the chemical agent comprises D-sorbitol Hexaacetate, and the mass ratio of diamond to D-sorbitol Hexaacetate is about 1:2.9.

3. The heat transfer composition of claim 1, wherein the nano-particle size diamond powder comprises particles having an average size of less than 100 nanometers.

4. The heat transfer composition of claim 1, wherein the heat transfer medium is selected from the group consisting of water; aqueous brines; mixtures of water with at least one of the group consisting of alcohols, glycols, and ammonia; hydrocarbons; mineral oils; natural oils; synthetic oils; fats; waxes; ethers; esters; glycols; halogen derivatives of at least one of the group consisting of hydrocarbons, mineral oils, natural oils, synthetic oils, fats, waxes, ethers, esters, and glycols; silicate esters; biphenyl; polyaromatic compounds; salt-hydrates, organic eutectics, clathrate-hydrates; paraffins; inorganic and organic eutectic mixtures; and combinations thereof.

5. The heat transfer composition of claim 1, further including at least one additional additive selected from the group consisting of functionalizing agents, dispersants, surfactants, antioxidants, and combinations thereof.

6. A heat transfer composition comprising:
   soy-based oil; and
   a nano-particle size diamond powder suspended in the heat transfer medium.

7. The heat transfer composition of claim 6, wherein the nano-particle size diamond powder is characterized by a first mass, further comprising a chemical agent characterized by a second mass, wherein the ratio of the second mass to the first mass is greater than one.

8. The heat transfer composition of claim 7, wherein the chemical agent comprises D-sorbitol Hexaacetate, and the mass ratio of diamond to D-sorbitol Hexaacetate is about 1:2.9.

9. The heat transfer composition of claim 7, wherein the powder comprises particles having an average size of less than 100 nanometers.

10. The heat transfer composition of claim 7, wherein the heat transfer medium is selected from the group consisting of water; aqueous brines; mixtures of water with at least one of the group consisting of alcohols, glycols, and ammonia; hydrocarbons; mineral oils; natural oils; synthetic oils; fats; waxes; ethers; esters; glycols; halogen derivatives of at least one of the group consisting of hydrocarbons, mineral oils, natural oils, synthetic oils, fats, waxes, ethers, esters, and glycols; silicate esters; biphenyl; polyaromatic compounds; salt-hydrates, organic eutectics, clathrate-hydrates; paraffins; inorganic and organic eutectic mixtures; and combinations thereof.

11. The heat transfer composition of claim 7, wherein the volume fraction of the nano-particle size diamond powder to the heat transfer medium is in the range of 0.01% to 10.0%.

12. The heat transfer composition of claim 7, wherein the volume fraction of the nano-particle size diamond powder to the heat transfer medium is in the range of 0.05% to 5.0%.

13. The heat transfer composition of claim 7, further including at least one additional additive selected from the group consisting of functionalizing agents, dispersants, surfactants, antioxidants, and combinations thereof.

14. A heat transfer composition comprising:
   soy-based oil with a first volume; and
   a nano-particle size conductive material powder with a second volume, wherein the nano-particle size diamond powder is suspended in the heat transfer medium to form a suspension in which the volume fraction of the nano-particle size conductive material powder to the heat transfer medium is in the range of 0.01% to 10.0%.

15. The heat transfer composition of claim 14, wherein the volume fraction of the nano-particle size dimond powder to the heat transfer medium is in the range of 0.05% to 5.0%.

16. The heat transfer composition of claim 14, wherein the nano-particle size diamond powder is characterized by a first mass, further comprising a chemical agent characterized by a second mass, wherein the ratio of the second mass to the first mass is greater than one.

17. The heat transfer composition of claim 16, wherein the chemical agent comprises D-sorbitol Hexaacetate, and the mass ratio of diamond to D-sorbitol Hexaacetate is about 1:2.9.

18. The heat transfer composition of claim 14, wherein the nano-particle size dimond powder comprises particles having an average size of less than 100 nanometers.

19. The heat transfer composition of claim 14, wherein the heat transfer medium is selected from the group consisting of water; aqueous brines; mixtures of water with at least one of the group consisting of alcohols, glycols, and ammonia; hydrocarbons; mineral oils; natural oils; synthetic oils; fats; waxes; ethers; esters; glycols; halogen derivatives of at least one of the group consisting of hydrocarbons, mineral oils, natural oils, synthetic oils, fats, waxes, ethers, esters, and glycols; silicate esters; biphenyl; polyaromatic compounds; salt-hydrates, organic eutectics, clathrate-hydrates; paraffins; inorganic and organic eutectic mixtures; and combinations thereof.

20. The heat transfer composition of claim 14, further including at least one additional additive selected from the group consisting of functionalizing agents, dispersants, surfactants, antioxidants, and combinations thereof.

* * * * *

UNITED STATES PATENT AND TRADEMARK OFFICE
CERTIFICATE OF CORRECTION

PATENT NO.         : 6,858,157 B2
APPLICATION NO. : 10/417842
DATED                : February 22, 2005
INVENTOR(S)       : Jimmy L. Davidson and Dale T. Bradshaw It is certified that error appears in the above-identified patent and that said Letters Patent is hereby corrected as shown below:

On The Title Page, item (73):

The Assignee name should read

-- Assignees:   Vanderbilt University, Nashville, TN (US)
                Tennessee Valley Authority, Knoxville, TN (US) --

Signed and Sealed this

Nineteenth Day of February, 2008

JON W. DUDAS
*Director of the United States Patent and Trademark Office*